US012646813B2

(12) United States Patent
Lamb et al.

(10) Patent No.: US 12,646,813 B2
(45) Date of Patent: Jun. 2, 2026

(54) STAMPED METAL INTERDIGITAL BANDPASS RF FILTER

(71) Applicant: Honeywell International Inc., Charlotte, NC (US)

(72) Inventors: Jonathan Lamb, Raleigh, NC (US); Nicholas Perry, Wendell, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 145 days.

(21) Appl. No.: 18/388,440

(22) Filed: Nov. 9, 2023

(65) Prior Publication Data

US 2025/0158260 A1 May 15, 2025

(51) Int. Cl.
*H01P 1/20* (2006.01)
*H01P 11/00* (2006.01)

(52) U.S. Cl.
CPC .............. *H01P 1/20* (2013.01); *H01P 11/007* (2013.01)

(58) Field of Classification Search
CPC ................................. H01P 1/20; H01P 11/007
USPC ....... 333/202, 203, 204, 205, 238, 244, 246, 333/247
See application file for complete search history.

(56) References Cited

U.S. PATENT DOCUMENTS 5,008,956 A 4/1991 Hemmie
6,122,533 A 9/2000 Zhang et al.
6,356,168 B1 3/2002 Barnett et al.
10,491,192 B1 11/2019 Plesski et al.
10,819,309 B1 10/2020 Turner et al.
2011/0092171 A1* 4/2011 Delforce ................. H01P 1/213 455/90.2
2018/0145385 A1* 5/2018 Howard ................ H01P 1/2088
2018/0269557 A1* 9/2018 Fangfang ................ H01P 3/121
2019/0207652 A1* 7/2019 Scoggins ................ H04L 43/08

FOREIGN PATENT DOCUMENTS

CN 115360486 A 11/2022
DE 4330491 A1 3/1995

OTHER PUBLICATIONS

"Honeywell Next Gen Gatekeeper", 2022 Honeywell International Inc.

* cited by examiner

*Primary Examiner* — Jorge L Salazar, Jr.
(74) *Attorney, Agent, or Firm* — Ingrassia Fisher & Lorenz LLP

(57) ABSTRACT

A bandpass filter can be configured, which includes a filter structure that includes a filter chamber and a group of tuned elements including first tuned elements and last tuned elements, wherein the first tuned elements and the last tuned elements include a pin that joins a connection medium to connect to a radio frequency (RF) signal path. An outer perimeter can connect to a ground plane present on the connection medium. The ground plane can form a bottom of the filter chamber. The group of tuned elements can be folded into a shape that occupies a space midway between a top lid and the ground plane. Alternatively, the group of tuned elements can be located above the ground plane on a single side of the filter structure.

18 Claims, 12 Drawing Sheets

STAMPED METAL INTERDIGITAL BANDPASS RF FILTER

TECHNICAL FIELD

Embodiments are generally related to the field of wireless/radio frequency (RF) technologies. Embodiments further relate to the field of RF filters used wireless/RF applications. Embodiments further relate to bandpass RF filters. Embodiments also relate to interdigital bandpass filters.

BACKGROUND

In wireless/radio frequency (RF) engineering, mitigating received signal interference and output signal filtering are critically important. A strong signal on a nearby frequency may block out the desired signal from being received. For example, a nearby cell tower may produce a strong signal which makes it more difficult to receive weaker or more distant signals. Likewise, it is important to make sure that the transmitters in our products are not emitting signals at any frequencies other than the intended band of operation, which could interfere with the operation of other devices. Organizations like the FCC in the United States or ISED Canada set limits on the levels of "spurious emissions" that a product can produce in addition to the intended radio signals.

For these reasons, RF engineers employ a variety of "RF filters," or circuits which block certain frequencies and allow others to pass through. This includes "lowpass" filters which pass signals below a certain frequency but block signals above the "cutoff frequency", "high pass" filters which passes frequencies above the cutoff and blocks frequencies below the cutoff, "bandpass" filters which pass signals in a specified range of frequencies but block frequencies above or below the cutoffs, and "bandstop" or "notch" filters which block frequencies in a specified range and pass frequencies above or below the cutoffs. FIG. 1 illustrates prior art example graphs 10 and 12 respectively depicting the frequency response of a lowpass filter and a bandpass filter.

A bandpass filter is a type of electrical filter with a frequency response which allows a specific range of frequencies to pass from the input to the output of the filter with minimal loss, while simultaneously having high loss at frequencies above and below the band of interest. By reducing the signal power of frequencies outside the band of interest, this can block out of band signals or noise from interfering with a receiver, or it can prevent unintended spurious signals from being transmitted out of a transmitter. Bandpass filters are ubiquitous in the design of RF transceivers.

There are a variety of ways in which RF engineers may design and build RF filters. Some common examples may include using discrete inductors and capacitors (often referred to as "L-C filters"), filter structures etched into the copper of the printed circuit board (PCB) or tuned mechanical structures such as cavity resonators. Each offers different advantages and trade-offs such as passband loss, steeper roll-off at the cutoff frequency, physical size, maximum power handling, and cost.

One type of filter used in wireless applications is an interdigital filter, which is a type of tuned mechanical filter structure, which refers to the interleaved "fingers" or "digits" of the tuned elements, which are coupled to one another to create a bandpass filter at a particular set of frequencies.

This filter topology has traditionally been configured either through machined metal fingers in an enclosed box or etched into a printed circuit board (PCB). FIG. 2 illustrates prior art examples of a machined interdigital filter 22 and an etched PCB interdigital filter 24.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved RF filter.

It is another aspect of the embodiments to provide for a bandpass RF filter.

It is a further aspect of the embodiments to provide for an interdigital bandpass RF filter.

It is yet another aspect of the embodiments to provide for an interdigital filter, which can be configured using low-cost, high-volume metal stamping techniques.

The aforementioned aspects and other objectives can now be achieved as described herein. In an embodiment, a bandpass filter can comprise: a filter structure including a filter chamber and a plurality of tuned elements including first tuned elements and last tuned elements, wherein the first tuned elements and the last tuned elements comprise a pin that joins a connection medium to connect to a radio frequency (RF) signal path; and an outer perimeter that connects to a ground plane present on the connection medium, wherein the ground plane forms a bottom of the filter chamber, and the plurality of tuned elements is folded into a shape that occupies a space midway between a top lid and the ground plane, or the plurality of tuned elements is located above the ground plane on a single side of the filter structure.

In an embodiment, the ground plane can comprise a bottom ground plane.

In an embodiment, the connection medium can comprise a printed circuit board (PCB).

In an embodiment, the filter structure can mitigate RF signal interferences.

In an embodiment, the filter structure can mitigate interference between signals in a range of approximately 902-928 MHz and signals in a range of approximately 824-894 MHz.

In an embodiment, the filter structure is mostly enclosed and less susceptible to incoming noise while avoiding signals radiating outward causing interference with other signals.

In an embodiment, the plurality of tuned elements can be folded into the shape using progressive-die stamping.

In an embodiment, the top lid can enclose the filter chamber and the plurality of tuned elements.

In an embodiment, the filter structure can be implemented in at least one of: a non-meter gatekeeper or a meter gatekeeper.

In an embodiment, a bandpass filter can comprise: a filter structure comprising a filter chamber and a plurality of tuned elements including first tuned elements and last tuned elements, wherein the first tuned elements and the last tuned elements comprise a pin that joins a printed circuit board to connect to a radio frequency (RF) signal path; and an outer perimeter that connects to a ground plane present on the printed circuit board, wherein the ground plane forms a bottom of the filter chamber.

In an embodiment, a method of forming a bandpass filter, can involve: providing a filter structure including a filter chamber and a plurality of tuned elements including first tuned elements and last tuned elements, wherein the first tuned elements and the last tuned elements comprise a pin that joins a connection medium to connect to a radio frequency (RF) signal path; connecting an outer perimeter to a ground plane present on the connection medium, wherein the ground plane forms a bottom of the filter chamber; and folding the plurality of tuned elements into a shape using progressive-die stamping.

In an embodiment of the method, the plurality of tuned elements can be folded into the shape, wherein the shape occupies a space midway between the top lid and the ground plane.

An embodiment of the method can further involve locating the plurality of tuned elements above the ground plane on a single side of the filter structure.

In an embodiment of the method, the connection medium can be a printed circuit board (PCB).

In an embodiment of the method, the filter structure can mitigate RF signal interferences.

An embodiment of the method can further involve: configuring the filter structure to be mostly enclosed and less susceptible to incoming noise while avoiding signals radiating outward causing interference with other signals.

An embodiment of the method can further involve: implementing the filter structure in at least one of: a non-meter gatekeeper or a meter gatekeeper.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

In the drawings described and illustrated herein, identical or similar parts and elements are generally indicated by identical reference numerals.

DETAILED DESCRIPTION

Figure 1:
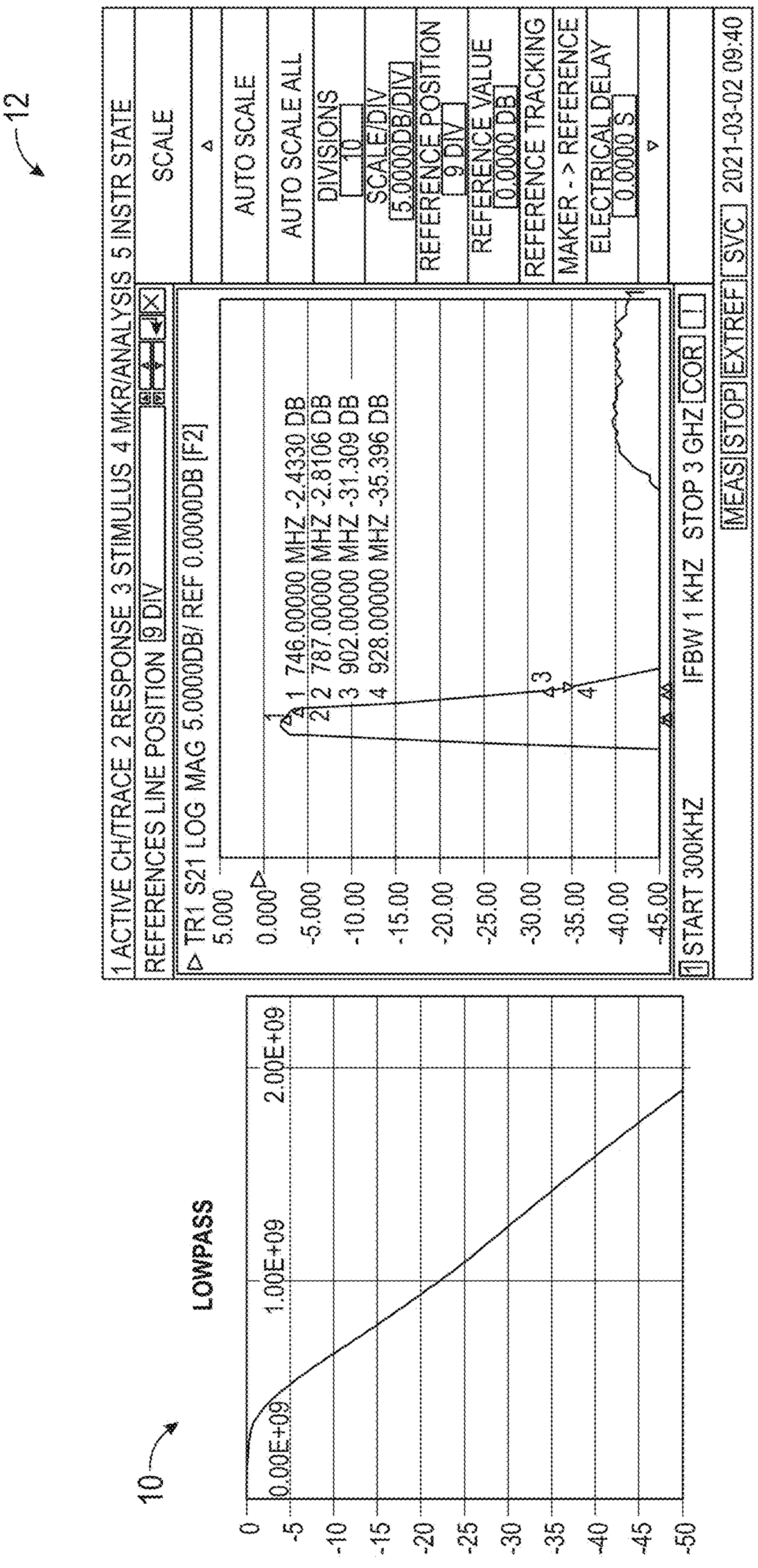
FIG. 1 (Prior Art)
FIG. 1 illustrates prior art examples graphs depicting the frequency response of a lowpass filter and a bandpass filter.
Figure 2:
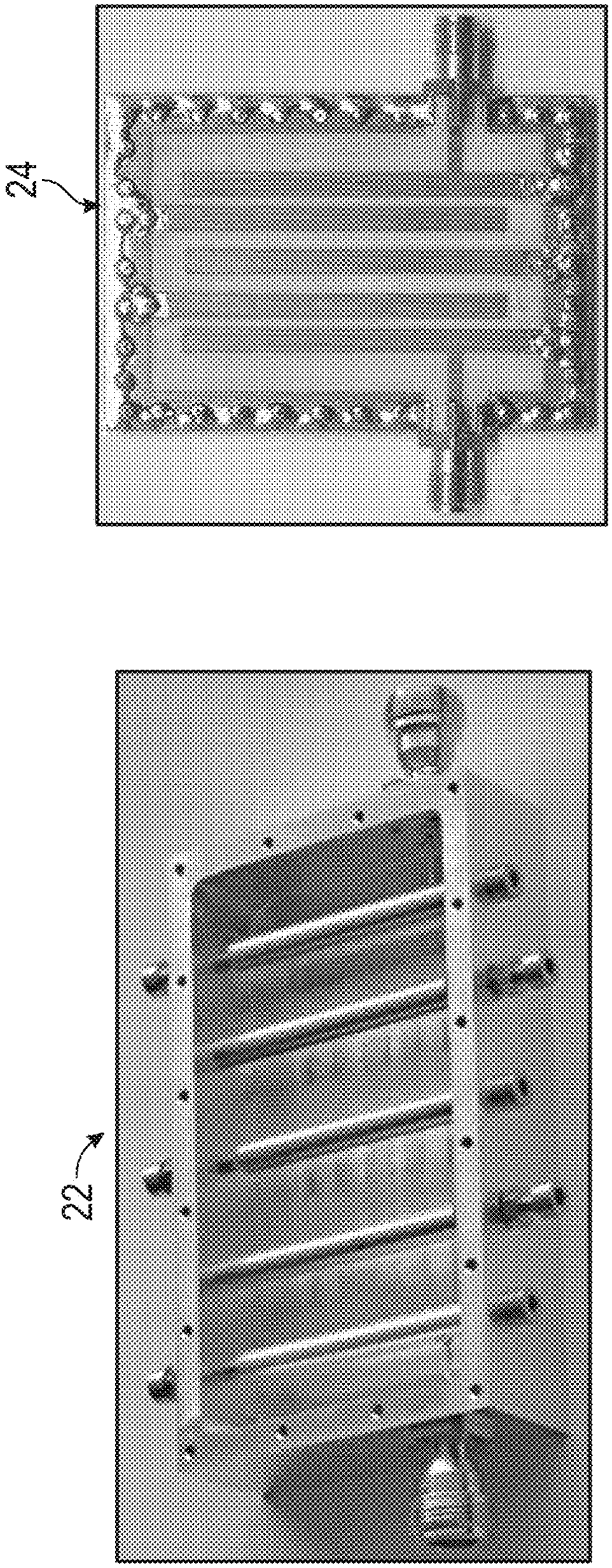
FIG. 2 (Prior Art)
FIG. 2 illustrates prior art examples of a machined interdigital filter and an etched PCB interdigital filter.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As more of electronic devices in modern society become connected and operate wirelessly, it is important to find innovative ways to implement high-performance filters for low cost.

A machined filter might have low loss and a sharp roll-off which gives good suppression at a frequency of interest, but it may be prohibitively expensive or impractically large at certain frequencies. An L-C filter might be low cost and small in size, but it may not have a sharp enough roll-off to prevent interference without being overly lossy. An etched PCB filter usually requires the PCB to be made from special RF-friendly materials with low dielectric losses and tightly controlled dielectric constants, which can add to the cost of a design. Sound Acoustic Wave filters (SAW filters) offer sharp roll-off in a small size, but they are easily damaged by high signal power and are not suitable above certain power levels.

Stamped metal parts have the advantage of being relatively inexpensive to produce in quantity after the initial tooling cost. For high volume applications, parts made with these manufacturing methods are very cost effective. Likewise, mechanical filter topologies can offer high performance, so a combination of the two can offer high performance for low cost. By plating these parts with solderable platings, these parts can be easily integrated onto a PCB. These solid-metal parts should also be able to handle high signal power without issue.

Note that as utilized herein and in the context of interdigital filter used in wireless communications applications, the term "interdigital" can relate to the arrangement of two or more sets of conductive fingers or elements that can be interleaved or interwoven with each other. These conductive elements may be made from metal and can be designed to create a compact and high-performance filtering structure for RF signals. The interdigital filter disclosed herein can be used to selectively pass or block specific frequency components of an RF signal. The interdigital structure of such a filter can allow for a precise control of the filter's frequency response by adjusting the spacing, length, quantity, and other parameters of the interwoven fingers. By properly designing the interdigital elements, the filter can be tuned to attenuate unwanted frequencies while passing the desired signal frequencies.

An interdigital filter is one of many classical geometrical arrangements used for RF and microwave-frequency filters. As noted earlier, it relies on interleaved fingers (or "digits") of tuned quarter-wavelength resonators which are coupled to each other by placing them parallel to one another. By tuning the length, width, quantity, dielectric medium, and spacing of the elements, bandpass filters of different center frequencies, bandwidths, and roll-off characteristics can be designed. An important innovation offered by the disclosed embodiments involves constructing such a filter with this geometrical arrangement using inexpensive and highly scalable sheet metal progressive die-stamping manufacturing techniques.

Figure 3B:
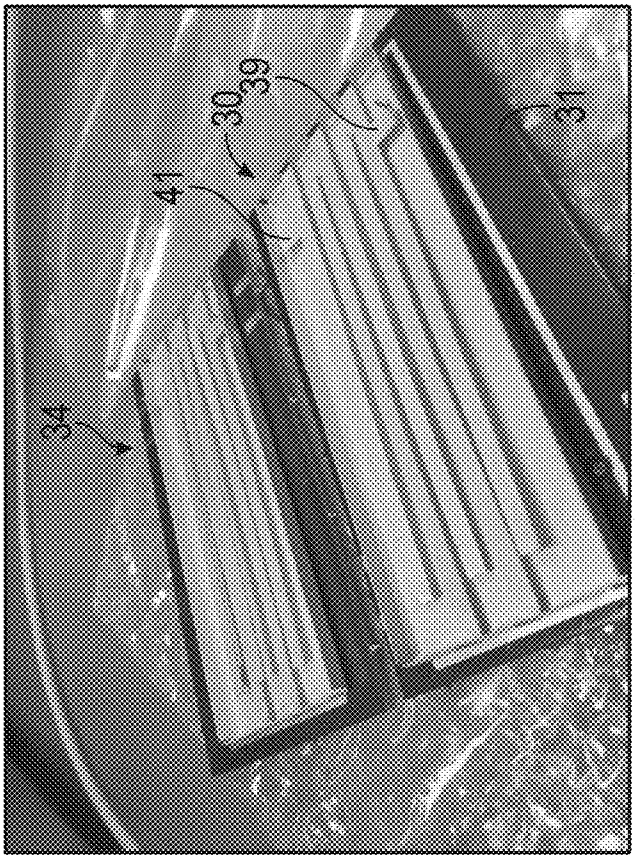
FIG. 3A and FIG. 3B illustrate an example of a stamped interdigital bandpass RF filter, which can be implemented in accordance with an embodiment.
Figure 3A:
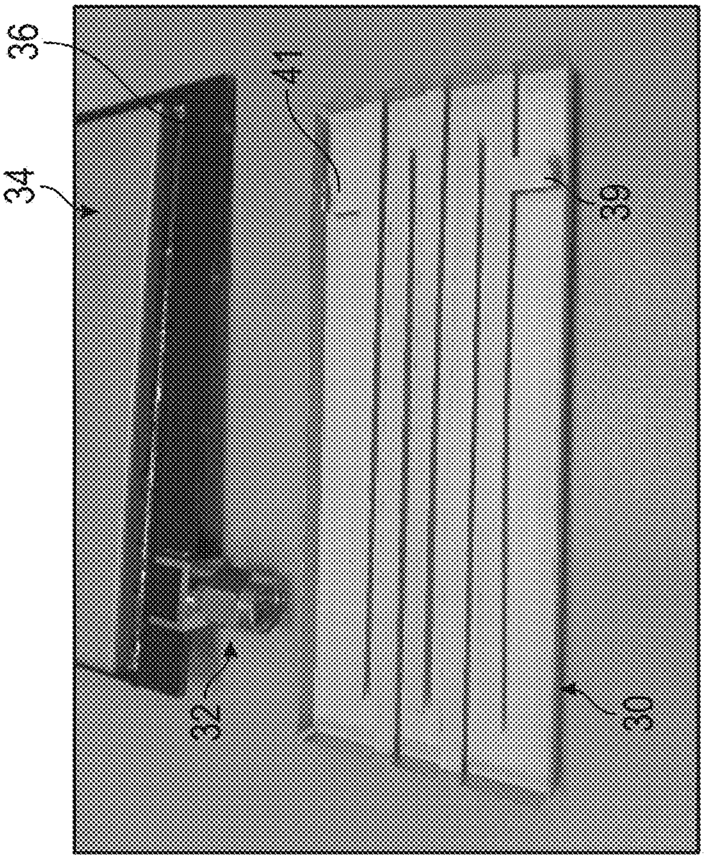

FIG. 3A and FIG. 3B illustrate an example of a bandpass filter 30, which can be implemented in accordance with an embodiment. The bandpass filter 30 can function as an interdigital bandpass RF filter 30 and may be in some instances, a 915 MHz stamped filter. The stamped interdigital bandpass RF filter 30 is shown upside-down in FIG. 3A and FIG. 3B to demonstrate how it can be mounted on a PCB. Note that reference to the specific frequency of 915 MHz herein is provided for illustrative and exemplary purposes only and it should be appreciated by those skilled in the art that the specific value of 915 MHz is not a limiting feature of the embodiments.

Note that the term 'stamped' as utilized herein can relate to the manufacturing or fabrication process used to create the filter structure for the bandpass filter 30. The stamped interdigital bandpass RF filter 30 can be produced by a stamping or cutting process, in which a metal sheet or substrate is precisely punched or cut and folded to create a desired pattern of tuned elements and interconnections that can define the characteristics of the stamped interdigital bandpass RF filter 30.

This manufacturing technique may involve using a stamping, cutting, or bending tools, which may be a die, laser, or form to cut or shape the metal substrate into the specific geometric patterns required for the operation of the stamped interdigital bandpass RF filter 30. The stamping process allows for high precision and repeatability in creating the filter structure for the stamped interdigital bandpass RF filter 30.

In FIG. 3A, a coupling 32 is shown with respect to a base portion 36 and another stamped interdigital bandpass RF filter 34, which is shown on a base portion 36. A base portion 31 is shown in FIG. 3B with respect to the stamped interdigital bandpass RF filter 30. Note that the base portions 31 and 36 may be, in some embodiments, printed circuit boards.

Figure 4:
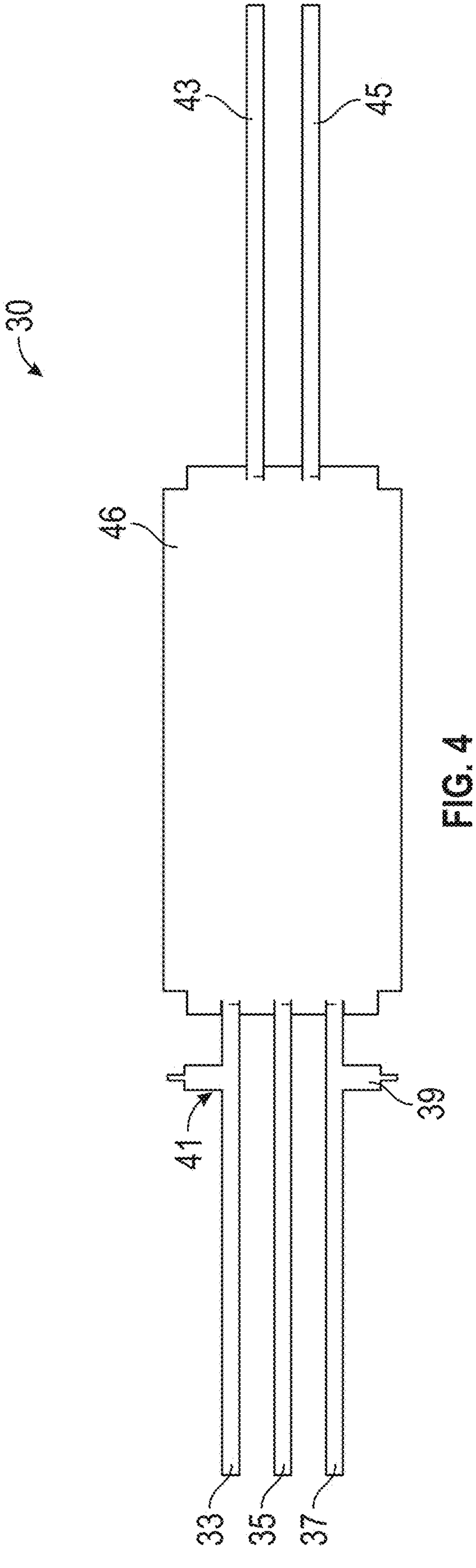
FIG. 4 illustrates the a top view of a flattened sheet of an interdigital bandpass RF filter before folding to form the interdigital bandpass RF filter, in accordance with an embodiment.

FIG. 4 illustrates the a top view of a flattened sheet 46 of an interdigital bandpass RF filter 30 before folding to form the interdigital bandpass RF filter 30, in accordance with an embodiment. The interdigital bandpass RF filter 30 shown in FIG. 4 includes a plurality of tuned elements 33, 35, 37, 43, and 45, along with one or more pins such as pins 41 and 39.

Figure 5A:
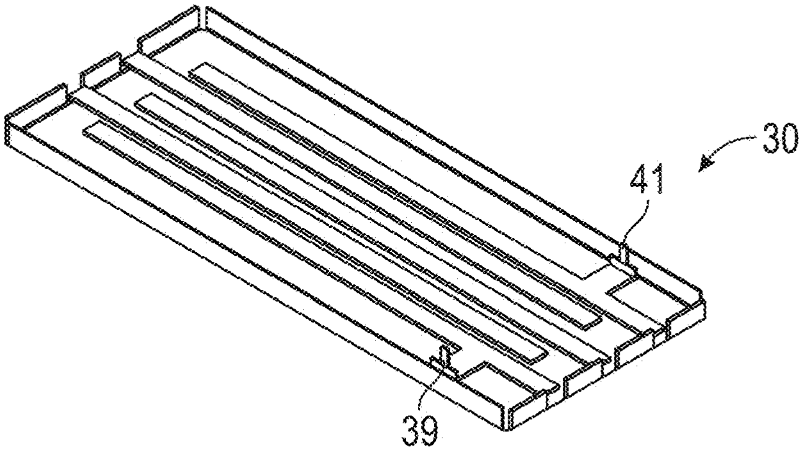
FIG. 5A illustrates a perspective view of an interdigital bandpass RF filter, in accordance with an embodiment.

FIG. 5A illustrates a perspective view of the interdigital bandpass RF filter 30, in accordance with an embodiment. The view of the interdigital bandpass RF filter 30 shown in FIG. 5A includes the pins 41 and 39.

Figure 5B:
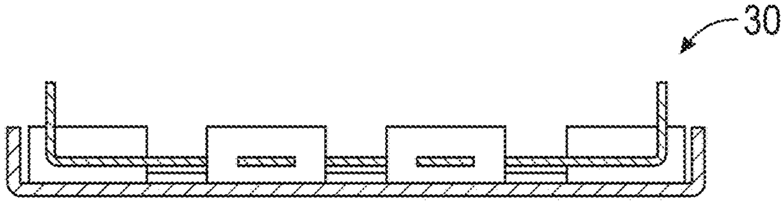
FIG. 5B illustrates a side sectional view of an interdigital bandpass RF filter, in accordance with an embodiment.
Figure 5C:
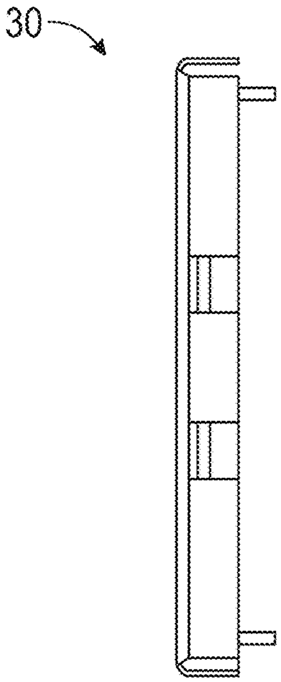
FIG. 5C illustrates a side view of an interdigital bandpass RF filter, in accordance with an embodiment.
Figure 5D:
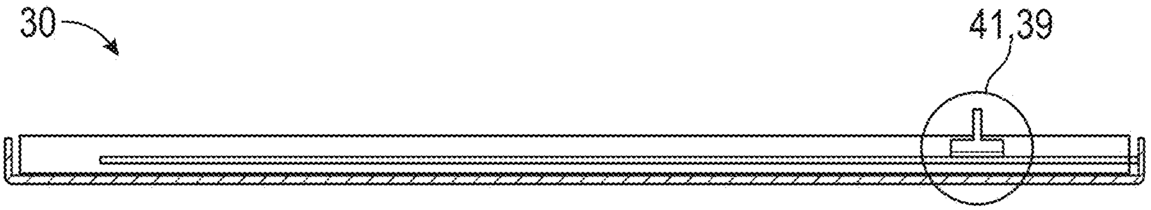
FIG. 5D illustrates a sectional A-A view of an interdigital bandpass RF filter, in accordance with an embodiment.
Figure 5E:
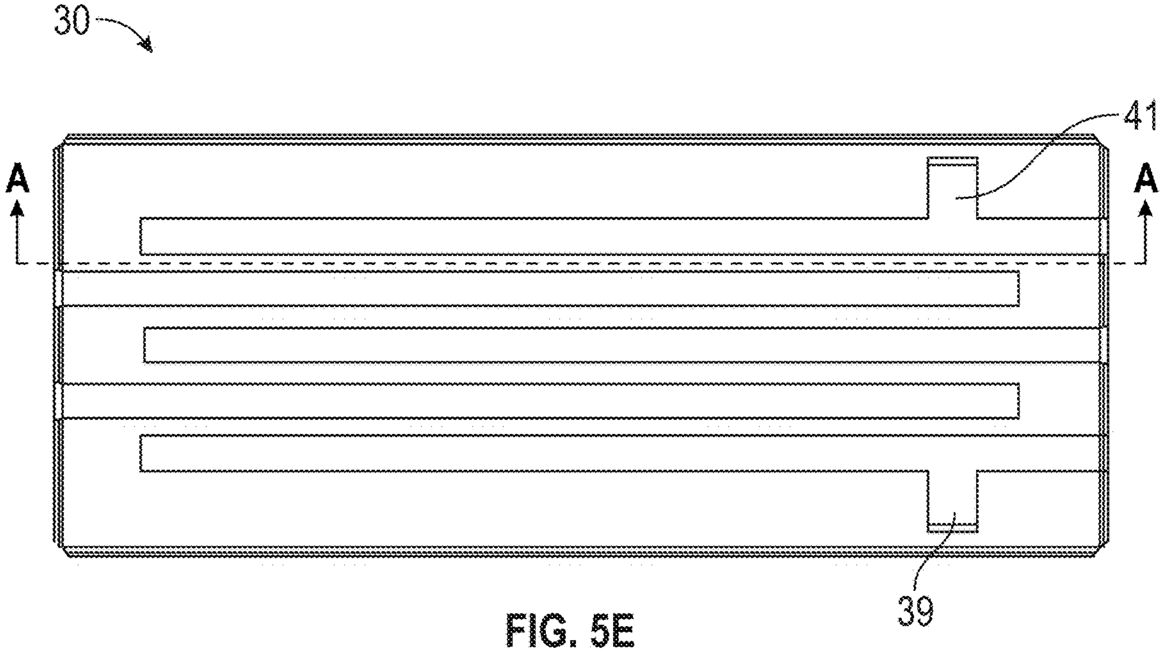
FIG. 5E illustrates a top view of an interdigital bandpass RF filter, in accordance with an embodiment.

FIG. 5B illustrates a sectional B-B view of the interdigital bandpass RF filter 30, in accordance with an embodiment. FIG. 5C illustrates another side view of an interdigital bandpass RF filter 30, in accordance with an embodiment. FIG. 5D illustrates a sectional A-A view of an interdigital bandpass RF filter 30, in accordance with an embodiment. FIG. 5E illustrates a top view of an interdigital bandpass RF filter, in accordance with an embodiment.

Figure 6:
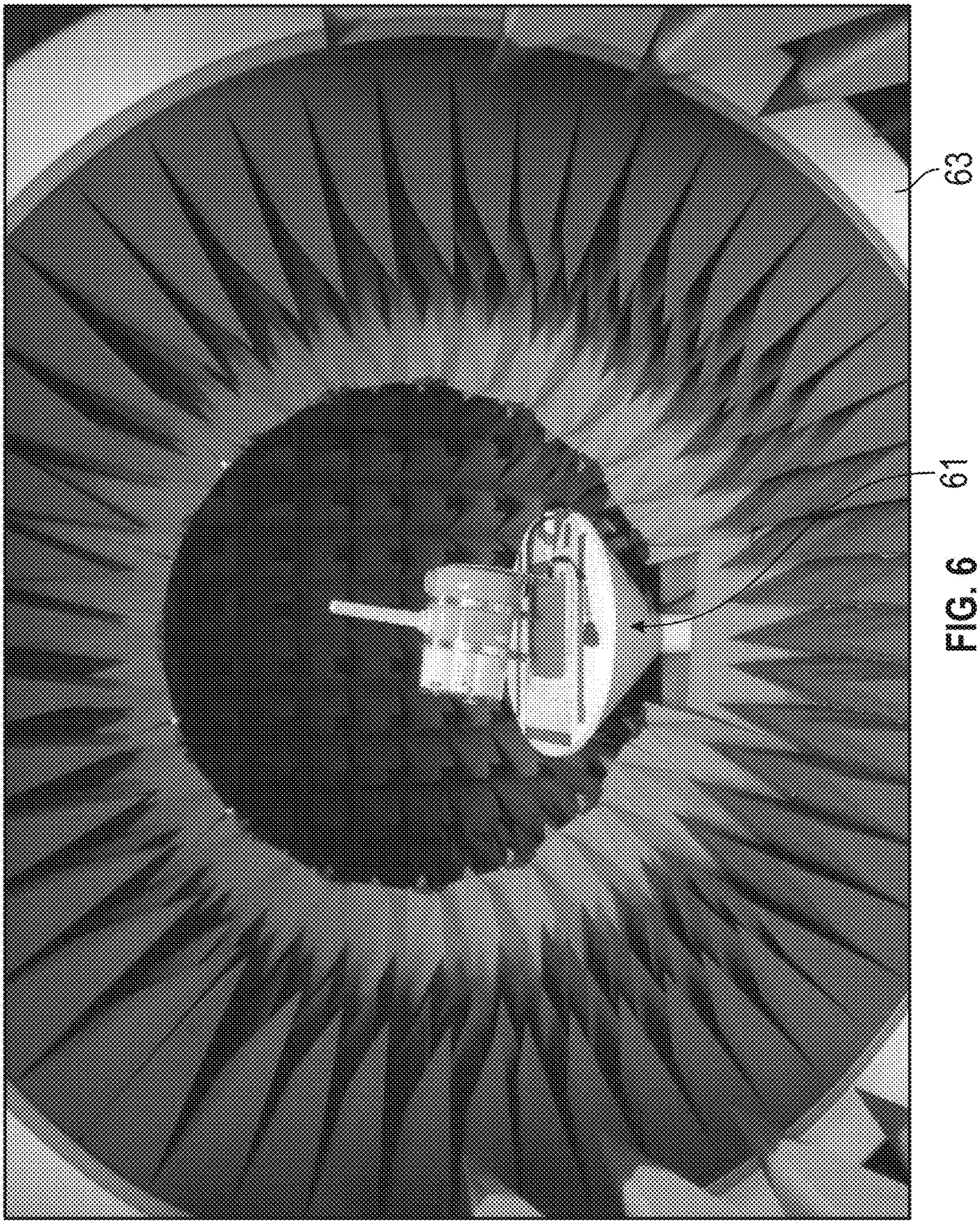
FIG. 6 illustrates an image of a meter gatekeeper within an antenna chamber, in accordance with an embodiment.

FIG. 6 illustrates an image 60 of a meter gatekeeper 21 within an antenna chamber 60, in accordance with an embodiment, and which incorporate usage of the interdigital bandpass RF filter 30. Note that the term "gatekeeper" as utilized herein can relate to a communications module that can network security, storage for network element data, management of the local area network, and multiple options for communication interfaces to wide area networks (WAN). A distributed intelligence can enable the meter gatekeeper 21 to enhance network performance by setting and managing message priorities as well as filtering redundant and low priority messages.

The meter gatekeeper 21 can deliver "intelligent" and highly effective management of a local area network while giving a utility extensive tools to support value-added services. The meter gatekeeper 21 can be implemented with meter or non-meter platforms with advanced smart grid and smart meter communications for utilities. The meter gatekeeper 21 is an intelligent interface between a head-end and a local area, which may include electric, water, and gas endpoints, as well as smart grid sensing and control devices.

Figure 7A:
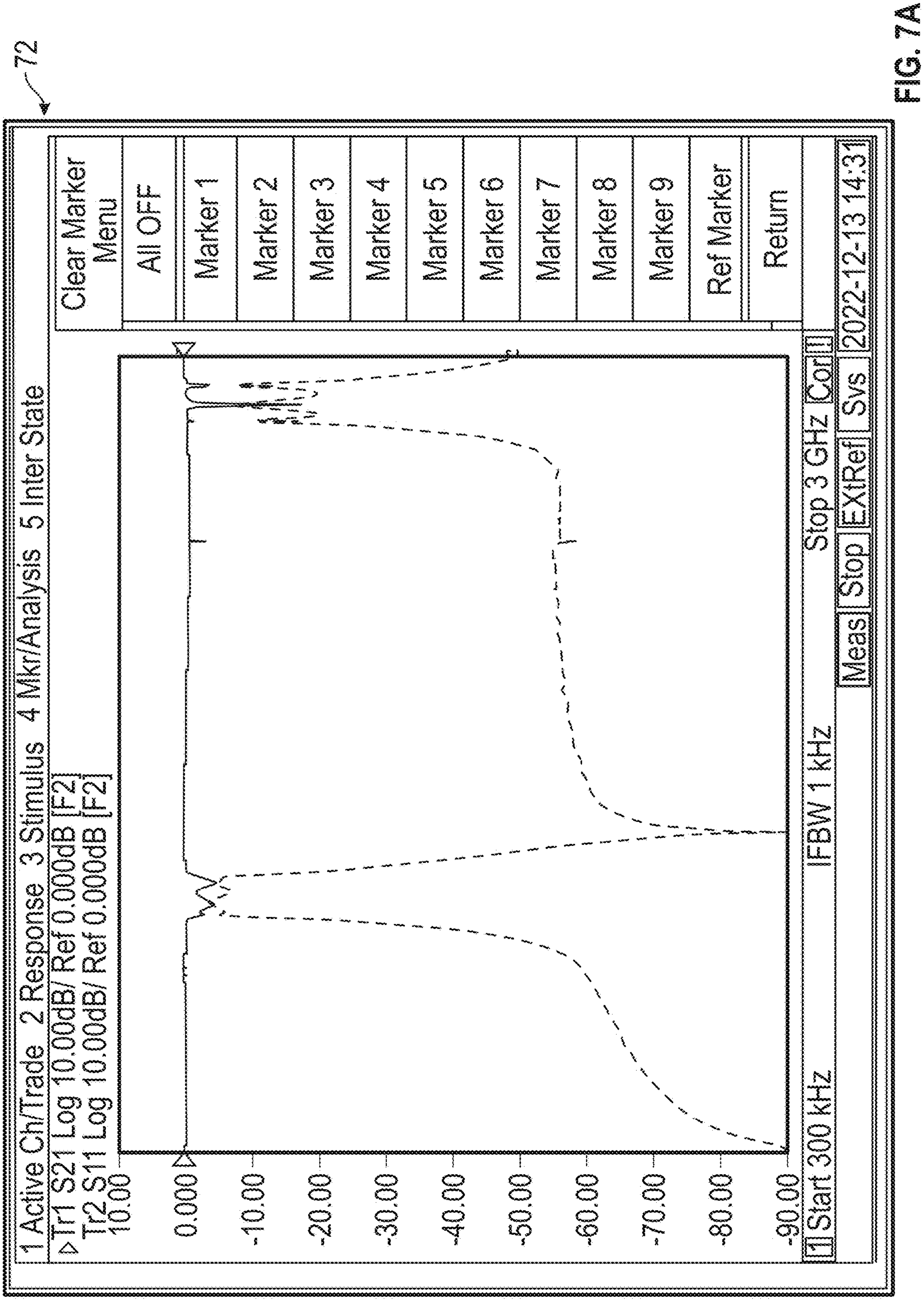
FIG. 7A. illustrates a graph of a frequency response from an experimental interdigital bandpass RF filter using a vector network analyzer, in accordance with an embodiment.
Figure 7B:
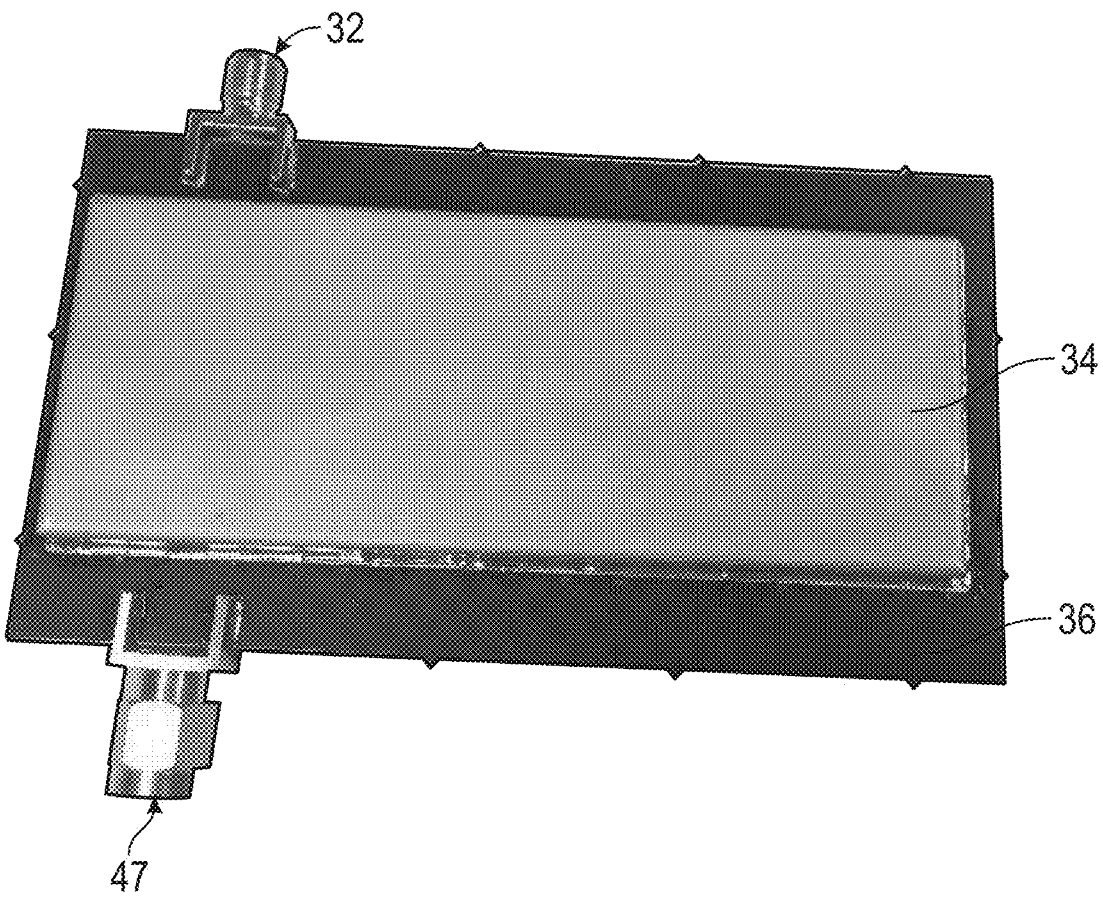
FIG. 7B illustrates an image of the experimental interdigital bandpass RF filter implemented in accordance with an embodiment.

FIG. 7A illustrates a graph 7A of a frequency response from an experimental interdigital bandpass RF filter using a vector network analyzer, in accordance with an embodiment. FIG. 7B illustrates an image of an experimental interdigital bandpass RF filter 34 implemented in accordance with an embodiment. Example couplings 32 and 47 are shown in FIG. 7A along with a base portion 36.

Figure 8A:
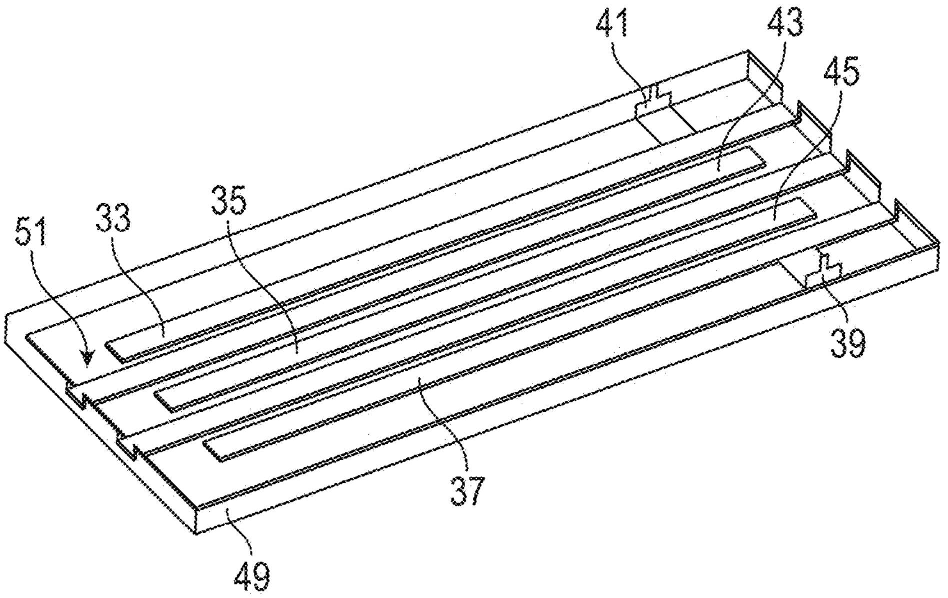
FIG. 8A illustrates a top perspective view of an interdigital bandpass RF filter, in accordance with an embodiment.

FIG. 8A illustrates a top perspective view of the interdigital bandpass RF filter 30, in accordance with an embodiment. In FIG. 8A, the tuned elements 33, 35, 37 may comprise one or more first tuned elements and the tuned elements 43 and 45 may comprise last tuned elements among a plurality of tuned elements. The plurality of tuned elements 33, 35, 37, 43, and 45 may each constitute interdigital fingers or elements that can be tuned to control the frequency response of the filter.

Figure 9:
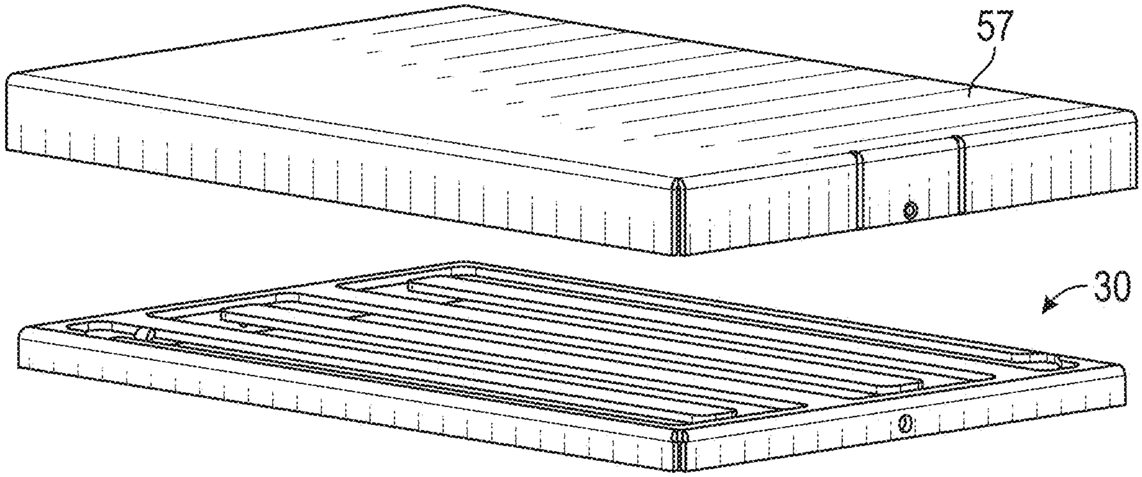
FIG. 9 illustrates a perspective view of the interdigital bandpass RF filter with respect to a lid, in accordance with an embodiment.

The interdigital bandpass RF filter 30 in this embodiment can include an outer perimeter 49 that forms the walls of a filter chamber 51. Although not shown in the FIG. 8A, a lid may be located on top of the filter chamber 51. An example of such a lid is shown in FIG. 9.

Figure 8B:
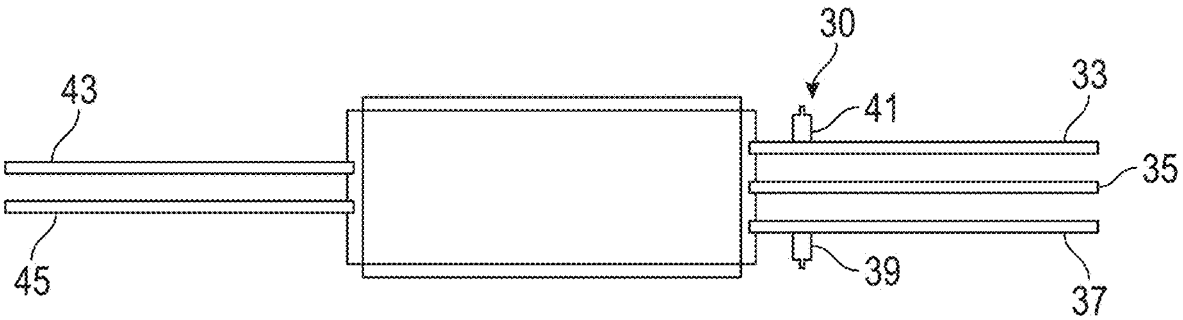
FIG. 8B illustrates an expanded flat view of the an interdigital bandpass RF filter, in accordance with an embodiment.
Figure 8C:
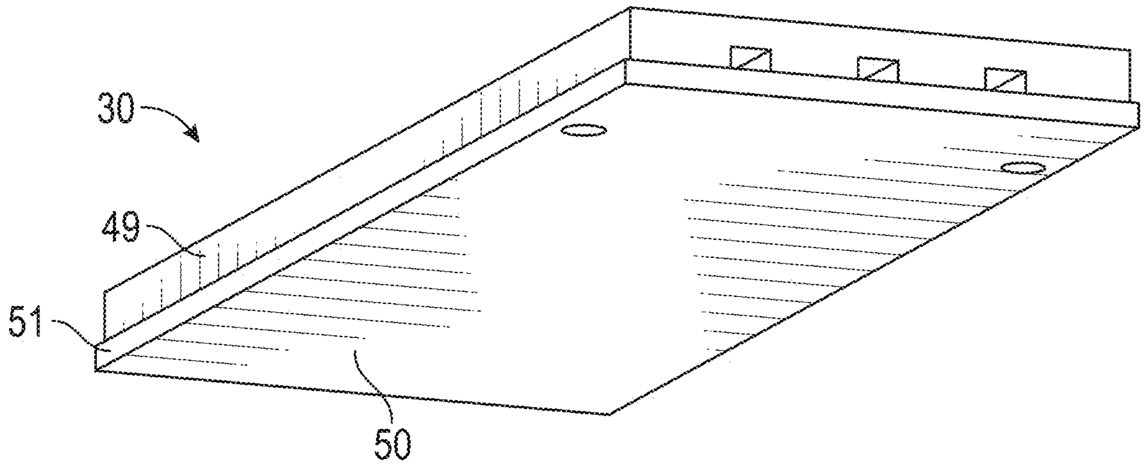
FIG. 8C illustrates a bottom perspective view of the an interdigital bandpass RF filter, in accordance with an embodiment.

FIG. 8B illustrates an expanded flat view of the interdigital bandpass RF filter 30, in accordance with an embodiment. FIG. 8C illustrates a bottom perspective view of the interdigital bandpass RF filter 30, in accordance with an embodiment. In FIG. 8C, the outer perimeter 49 is shown as connected to a ground plane 53 of a PCB 51. The interdigital bandpass RF filter 30 is folded out of the single sheet in this embodiment (e.g., as shown in FIG. 8B) and then connected (e.g., soldered) to the PCB 51. The form factor is similar to a shield can, with tines in between to form a lid and a top copper layer in some embodiments can form the bottom of the interdigital bandpass RF filter 30. This allows the interdigital bandpass RF filter 30 to be fully enclosed and not pick up outside signals.

The interdigital bandpass RF filter 30 uses air as the dielectric in this embodiment, which is low loss at the cost of physical length/size but could be designed using a dielectric around or between the elements to alter the size, voltage breakdown characteristics, or mechanical properties of the filter. The interdigital bandpass RF filter 30 can be mounted directly on the PCB 51 and uses the top layer of copper as the bottom of the filter enclosure in this embodiment. This reduces the amount of material needed to make the filter while also keeping the interdigital bandpass RF filter 30 PCB-agnostic so that it can be ported between PCBs with differing stack-ups without needing to be re-tuned.

The interdigital bandpass RF filter 30 possesses a filter structure that includes the filter chamber 51 and a plurality of tuned elements including first tuned elements and last tuned elements, wherein the first tuned elements and the last tuned elements comprise a pin (e.g., pins 41 and 39) that can join a connection medium (e.g., PCB 51) to connect to a radio frequency (RF) signal path. The outer perimeter 49 can connect to the ground plane 53 present on the connection medium, such that the ground plane 53 can form the bottom of the filter chamber 51, and the plurality of tune elements are folded into a shape that occupies a space midway between a top lid (not shown in FIG. 8A, FIG. 8B, and FIG. 8C) and the ground plane 53. FIG. 9 illustrates a perspective view of the interdigital bandpass RF filter 30 with respect to a lid 57 (e.g., a top lid), which may be used to enclose the interdigital bandpass RF filter 30 as discussed above.

In some embodiments, the stamped interdigital bandpass RF filter 30 can function using quarter-wavelength resonators tuned for a specific operating frequency. The stamped interdigital bandpass RF filter 30 can be designed to pass the ISM 900 band, which ranges from 902-928 MHz, and suppresses signals below and above this range, with specific interest towards blocking signals in the nearby 869-894 MHz range, which corresponds to the downlink frequency range of LTE band 5 used by our cellular radio. It has been found in testing that an ISM 900 radio, when it was transmitting, also transmitted a low level of broadband spurious noise on adjacent channels which was reducing the sensitivity of our LTE radio when it was receiving. By adding a bandpass filter at the output of our ISM 900 radio, the noise received by an LTE receiver can be eliminated with only minimal impact to the output power of the ISM radio.

Due to the close proximity of the ISM 900 band and LTE band 5, a filter with a very sharp roll-off and tight tolerances on the center frequency and band-edge placement is needed to ensure that the filter will reliably pass 902-928 MHz while providing adequate suppression at 894 MHz and below. A SAW filter, while it might have achieved the necessary frequency response, is not rated to withstand high power for long periods and was determined to be unsuitable as it would be damaged or degrade over time due to the 1 W transmit power being used by our ISM radio. A filter made of solid metal should have no difficulty handing 1 W of RF power without damage or degradation.

It is important that the cellular radio always be available to the customer, so shutting off the LTE radio during ISM operation was deemed unacceptable. If a utility, for example, attempted to call the meter gatekeeper 21 over LTE while the ISM radio was operating, a time-interlocked radio would not be able to receive it. By using the interdigital bandpass RF filter 30, full simultaneous operations for both radios without interference, can be enabled. This can potentially be viewed as a differentiating feature from, for example, devices that use time-interlocking approaches, or a potential cost savings over devices that use expensive ceramic or machined filters to achieve this high level of performance.

Figure 11:
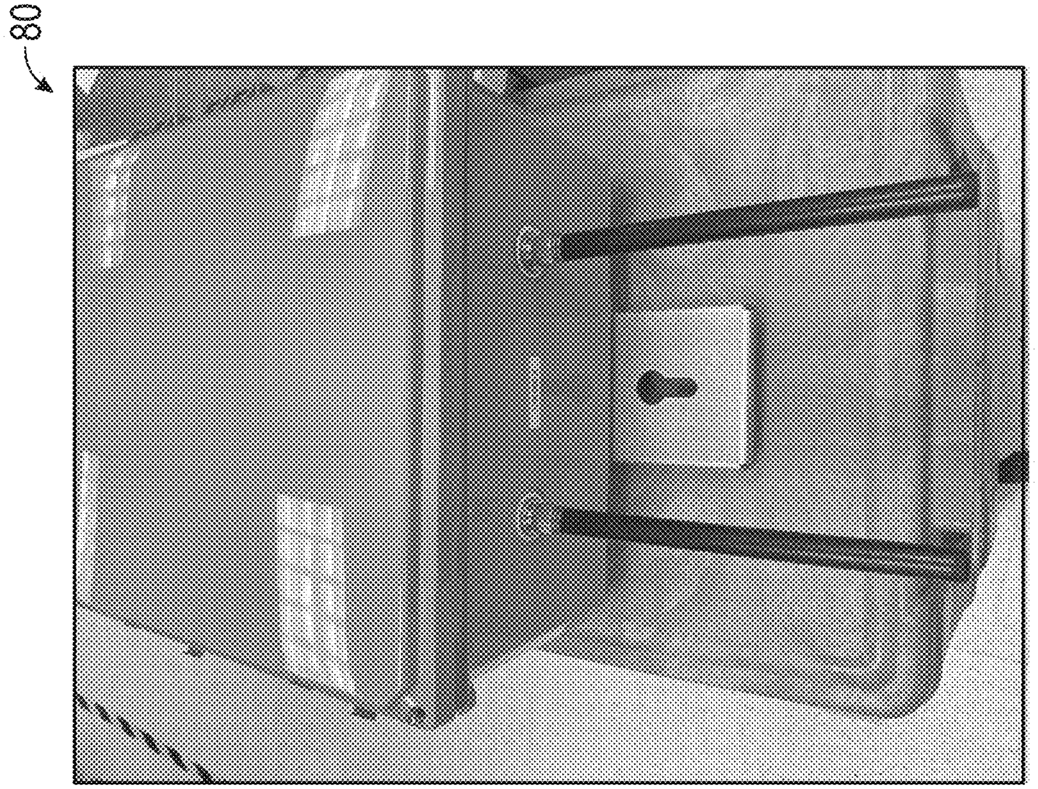
FIG. 11 illustrates an image of the NMGK shown in FIG. 10 in a closed position, in accordance with an embodiment.
Figure 10:
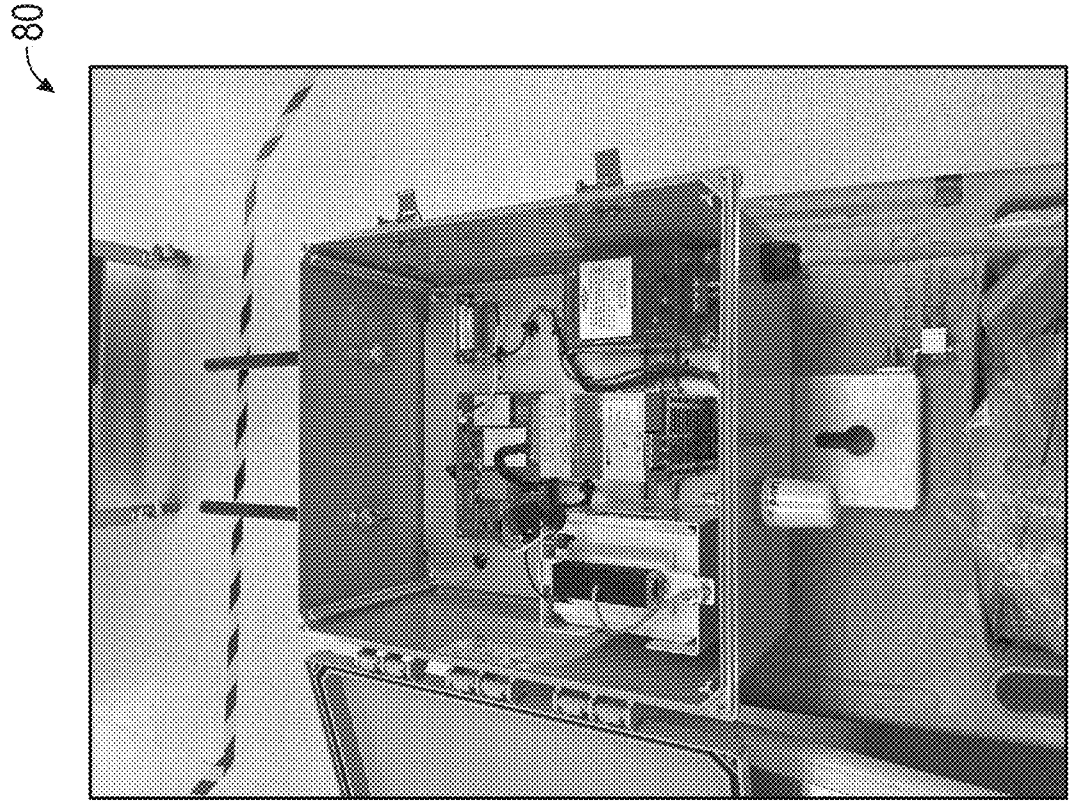
FIG. 10 illustrates an image of a non-meter GateKeeper (NMGK) in an open position, in accordance with an embodiment.

FIG. 10 illustrates an image of a non-meter GateKeeper (NMGK) 80 in an open position, in accordance with an embodiment. FIG. 11 illustrates an image of the NMGK 80 shown in FIG. 10 in a closed position, in accordance with an embodiment. Although the meter gatekeeper 21 was discussed earlier herein, it should be appreciated that the embodiments can find use in a wide variety of applications including the NMGK shown in FIGS. 10-11. The NMGK shown in FIGS. 10-11 can use a satellite board with a ceramic filter. The NMGK can be implemented in the context of a primary or preferred application of the embodiments, while the previously discussed meter gatekeeper 21 may be considered as a secondary or alternative application of the embodiments.

Based on the foregoing, it can be appreciated that a number of different embodiments are disclosed herein, including both preferred and alternative embodiments. For example, in an embodiment, a bandpass filter can comprise: a filter structure including a filter chamber and a plurality of tuned elements including first tuned elements and last tuned elements, wherein the first tuned elements and the last tuned elements comprise a pin that joins a connection medium to connect to a radio frequency (RF) signal path; and an outer perimeter that connects to a ground plane present on the connection medium, wherein the ground plane forms a bottom of the filter chamber, and the plurality of tuned elements is folded into a shape that occupies a space midway between a top lid and the ground plane, or the plurality of tuned elements is located above the ground plane on a single side of the filter structure.

In an embodiment, the ground plane can comprise a bottom ground plane.

In an embodiment, the connection medium can comprise a printed circuit board (PCB).

In an embodiment, the filter structure can mitigate RF signal interferences.

In an embodiment, the filter structure can mitigate interference between signals in a range of approximately 902-928 MHz and signals in a range of approximately 824-894 MHz.

In an embodiment, the filter structure is mostly enclosed and less susceptible to incoming noise while avoiding signals radiating outward causing interference with other signals.

In an embodiment, the plurality of tuned elements can be folded into the shape using progressive-die stamping.

In an embodiment, the top lid can enclose the filter chamber and the plurality of tuned elements.

In an embodiment, the filter structure can be implemented in at least one of: a non-meter gatekeeper or a meter gatekeeper.

In an embodiment, a bandpass filter can comprise: a filter structure comprising a filter chamber and a plurality of tuned elements including first tuned elements and last tuned elements, wherein the first tuned elements and the last tuned elements comprise a pin that joins a printed circuit board to connect to a radio frequency (RF) signal path; and an outer perimeter that connects to a ground plane present on the printed circuit board, wherein the ground plane forms a bottom of the filter chamber.

In an embodiment, a method of forming a bandpass filter, can involve: providing a filter structure including a filter chamber and a plurality of tuned elements including first tuned elements and last tuned elements, wherein the first tuned elements and the last tuned elements comprise a pin that joins a connection medium to connect to a radio frequency (RF) signal path; connecting an outer perimeter to a ground plane present on the connection medium, wherein the ground plane forms a bottom of the filter chamber; and folding the plurality of tuned elements into a shape using progressive-die stamping.

In an embodiment of the method, the plurality of tuned elements can be folded into the shape, wherein the shape occupies a space midway between the top lid and the ground plane.

An embodiment of the method can further involve locating the plurality of tuned elements above the ground plane on a single side of the filter structure.

In an embodiment of the method, the connection medium can be a printed circuit board (PCB).

In an embodiment of the method, the filter structure can mitigate RF signal interferences.

An embodiment of the method can further involve: configuring the filter structure to be mostly enclosed and less susceptible to incoming noise while avoiding signals radiating outward causing interference with other signals.

An embodiment of the method can further involve: implementing the filter structure in at least one of: a non-meter gatekeeper or a meter gatekeeper.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A bandpass filter, comprising:

a filter structure including a filter chamber and a plurality of tuned elements including first tuned elements and last tuned elements, wherein the first tuned elements and the last tuned elements comprise a pin that joins a connection medium to connect to a radio frequency (RF) signal path; and an outer perimeter that connects to a ground plane present on the connection medium, wherein the ground plane forms a bottom of the filter chamber, and wherein the plurality of tuned elements is located above the ground plane on a single side of the filter structure.

2. The bandpass filter of claim 1 wherein the ground plane comprises a bottom ground plane.

3. The bandpass filter of claim 1 wherein the connection medium comprises a printed circuit board (PCB).

4. The bandpass filter of claim 1 wherein the filter structure is configured to mitigate RF signal interferences.

5. The bandpass filter of claim 1 wherein the filter structure is configured to mitigate interference between signals in a range of approximately 902-928 MHz and signals in a range of approximately 824-894 MHz.

6. The bandpass filter of claim 1 wherein the filter structure is mostly enclosed and less susceptible to incoming noise while avoiding signals radiating outward causing interference with other signals.

7. The bandpass filter of claim 1 wherein the plurality of tuned elements is folded into a shape using progressive-die stamping.

8. The bandpass filter of claim 1 wherein the top lid encloses the filter chamber and the plurality of tuned elements.

9. The bandpass filter of claim 1 wherein the filter structure is configured to be implemented in a meter gatekeeper.

10. A method of forming a bandpass filter, comprising:

providing a filter structure including a filter chamber and a plurality of tuned elements including first tuned elements and last tuned elements, wherein the first tuned elements and the last tuned elements comprise a pin that joins a connection medium to connect to a radio frequency (RF) signal path;

connecting an outer perimeter to a ground plane present on the connection medium, wherein the ground plane forms a bottom of the filter chamber;

folding the plurality of tuned elements into a shape using progressive-die stamping; and locating the plurality of tuned elements above the ground plane on a single side of the filter structure.

11. The method of claim 10 wherein the plurality of tuned elements is folded into the shape, wherein the shape occupies a space midway between the top lid and the ground plane.

12. The method of claim 10 wherein the connection medium comprises a printed circuit board (PCB).

13. The method of claim 10 wherein the filter structure mitigates RF signal interferences.

14. The method of claim 10 further comprising configuring the filter structure to be mostly enclosed and less susceptible to incoming noise while avoiding signals radiating outward causing interference with other signals.

15. The method of claim 10 further comprising implementing the filter structure in a meter gatekeeper.

16. A method of operating a bandpass filter, comprising:

receiving a radio frequency (RF) signal at a filter structure comprising a filter chamber and a plurality of tuned elements including first tuned elements and last tuned elements;

coupling the RF signal to the first tuned elements and the last tuned elements through respective pins joined to a connection medium;

filtering the RF signal by resonating the plurality of tuned elements above a ground plane of the connection medium, the ground plane forming a bottom of the filter chamber, wherein the plurality of tuned elements is located above the ground plane on a single side of the filter structure;

passing frequency components of the RF signal within a designated passband through the filter structure; and attenuating frequency components of the RF signal outside of the designated passband, wherein the filter structure is implemented in a meter gatekeeper.

17. The method of claim 16 further configuring the filter structure to be mostly enclosed and less susceptible to incoming noise while avoiding signals radiating outward causing interference with other signals, wherein the filter structure mitigates RF signal interferences.

18. The method of claim 16 wherein the meter gatekeeper comprises an intelligent interface between a head-end and a local area, including at least one of: electric endpoints, water endpoints, gas endpoints, or smart grid-sensing and control devices.

* * * * *